Patented Apr. 3, 1951　　　　　　　　　　　　　　2,547,494

UNITED STATES PATENT OFFICE 2,547,494

PRODUCTION OF SUCCINIMIDO-ESTERS

Stanley P. Rowland, Philadelphia, Pa., assignor to Rohm & Haas Company, Philadelphia, Pa., a corporation of Delaware No Drawing. Application December 17, 1949, Serial No. 133,675

6 Claims. (Cl. 260—326.5)

This invention relates to a new process for the preparation of succinimido esters which have the general formula

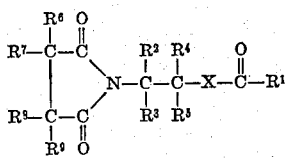

in which X represents an atom of oxygen or sulfur; in which the characters $R^2$, $R^3$, $R^4$, $R^5$ represent hydrogen atoms or monovalent, organic radicals which are unreactive with acid anhydrides, and therefore are free of alcoholic hydroxyl groups and primary or secondary amino groups, —$NH_2$ and NH, and which preferably are hydrocarbon radicals; in which $R^1$ also represents the same kind of monovalent, organic radicals as $R$'s$^{2\ to\ 5}$ but does not represent a hydrogen atom; and in which $R^6$, $R^7$, $R^8$ and $R^9$ represent hydrogen atoms or hydrocarbon radicals, preferably alkyl or alkenyl groups.

The process involves a new chemical reaction which comprises chemically combining (a) succinic anhydride or a substituted succinic anhydride of the formula

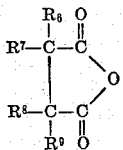

in which the R's have the same significance as is described above, with (b) anazoline or a thiazoline having the formula

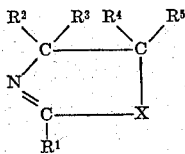

in which the R's and X have the significance described above. This reaction takes place according to the following general equation:

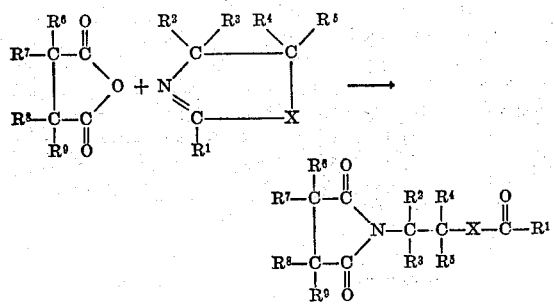

A specific example in which succinic anhydride, per se, and a particular oxazoline, 2-heptadecenyl oxazoline, are reacted may make for a clearer understanding, at the outset, of the new reaction of this invention:

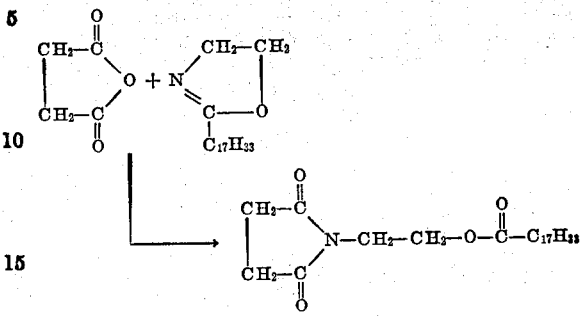

β-(Succinimidoethyl oleate)

Careful study has shown that the succinic anhydrides described herein react in the same manner as succinic anhydride per se, and that the thiazolines and other oxazolines described herein react in the same manner as the oxazoline above. That is, the groups which are represented by the nine R's and X in the general formula given above remain intact and unchanged during the process, and the reaction does in fact take the course shown above. This process has such advantages over other methods of making imido esters, as speed and ease of reaction, quantitativeness and freedom from the formation of by-products.

The organic radicals which are represented by $R$'s$^{1\ to\ 9}$ must be unreactive with acid anhydrides. That is, they must be entirely free of of such substituents as hydroxy groups and amino hydrogen atoms which are capable of reacting with acid anhydrides, so that no interfering side-relations can take place. It is preferred that these radicals be hydrocarbon radicals such as alkyl, aryl, alkaryl, aralkyl and cycloalkyl groups. The following list includes examples of such suitable, hydrocarbon radicals; methyl, ethyl, isopropyl, sec.-butyl, tert.-amyl, 2-ethylhexyl, lauryl, n-tetradecyl and octadecyl groups and the isomers of these groups; phenyl, tolyl, benzyl, p-octylphenyl, m-xylyl, 2,4-ditert.-amyl phenyl; cyclohexyl; and naphthyl groups. In addition, the hydrocarbon group which is represented by $R^1$ can be unsaturated. In fact a particularly valuable group of products are those in which $R^1$ is unsaturated. Such products have the added advantage of being more reactive and subject to oxidation and polymerization due to their unsaturation.

Although those reactants are preferred in which the substituents represented by the R's are hydrocarbon radicals, it is a fact that succinimido esters are readily prepared from succinic anhydrides and oxazolines or thiazolines in which the substituents R's[1 to 5] also contain other elements in addition to carbon and hydrogen. Such substituents however must be inert in the sense that they do not undergo reaction themselves with acid anhydrides. However, halogen groups, —Cl, —Br and —I, may be present on the R-substituents as well as nitro, —NO$_2$, ether, —OR, keto, —C=O, aldehydo, —CHO, sulfonic, —SO$_3$H, carboxyl, —COOH, or tertiary amino groups, —NR$_2$. None of these groups reacts with acid anhydrides and none interferes with the reaction of the succinic anhydrides with the oxazolines or thiazolines.

The process of this invention gives rise to a large number of compounds, many of which were unknown heretofore. All of the compounds, however, fall within the class described by the above general formula. A large class of operable oxazolines and thiazolines are known and are shown in the literature. All of these react with succinic anhydrides to form succinimido esters by the methods set forth in the examples below. All that is required is to substitute an equivalent amount of one azoline: i. e. an oxazoline or a thiazoline, for the particular azolines shown in the examples. Thus in the same manner, the following azolines, of which the skeletal structure is

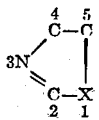

and in which X is an oxygen atom in oxazolines or a sulfur atom in thiazolines, combine in equimolecular amounts with succinic anhydrides to form the corresponding succinimido esters: 2-phenyl azolines; 2-p-tolyl azolines; 2-o-tolyl azolines; 2-benzyl azolines; 2-(o-, m-, and p-nitrophenyl) azolines; p-chlorobenzyl azolines; 2-undecyl-5-chloromethyl azolines; 2,4-diphenyl azolines; 2,5-diphenyl azolines; 2-phenyl-5-chloromethyl azolines; 2-(p-nitrophenyl)-5-chloromethyl azolines; 2-(p-nitrophenyl)-5-diethylaminomethyl azolines; 2-(p-nitrophenyl)-5-dibutylaminomethyl azolines; 2-phenyl-5,5-dimethyl azolines; 2-phenyl-5-phenyl-5-methyl azolines; 2-(m- and p-nitrophenyl)-5,5-dimethyl azolines; 2-(α- or β-naphthyl) azolines; 2-p-methoxyphenyl azolines; 2-p-ethoxyphenyl azolines; 2-p-butoxyphenyl azolines; 2-(m-nitro-p-methoxyphenyl) azolines; 2-(p-nitrophenyl)-4-butyl azolines; 2-(p-nitrophenyl)-4-phenyl azolines; 2-phenyl-5-methyl azolines; 2-phenyl-5-ethyl azolines; 2-benzyl-5-methyl azolines; 2-styryl-5-methyl azolines; 2-(o- and p-tolyl)-5-methyl azolines; 2-(α and β-naphthyl)-5-methyl azolines; 2-phenyl-4,5-dimethyl azolines; 2-(p-nitrophenyl)-4,5-dimethyl azolines; 2-phenyl-4-methyl-5-ethyl azolines; 2,4,5-trimethyl azolines; 2-undecyl-4,4-dimethyl azolines; 2-phenyl-4-methyl-4-ethyl azolines; 2-phenyl-4,4-dimethyl azolines; 2-heptadecyl azolines; 2-heptadecenyl azolines; 2-heptadecyl-4,4-dimethyl azolines; 2-heptadecenyl-5-ethyl azolines; 2-phenyl-4-methyl-5-phenyl azolines; 2-methyl-4,5,5-triphenyl azolines; 2-phenyl-4-methyl-5,5-dibenzyl azolines; 2-heptadecyl-5-diethylaminomethyl azolines; 2-heptadecyl-5-ethyl azolines; 2-heptadecenyl-4,5,5-trimethyl azolines; 2,4,5-triisobutyl azolines; 2-heptadecyl-4,4,5,5-tetramethyl azolines; 2-methyl-4-isoamyl-4-methyl azolines; 2-heptadecyl-4-propyl-5-methyl azolines; 2-heptadecenyl-4,4-dimethyl-5-isopropyl azolines; 2-decyl-4,4-dibutyl-5-methyl azolines; and 2-heptadecyl-5-methyl-5-ethyl azolines.

Suitable succinic anhydrides which are known to react according to the process of this invention include the following: methyl; α-β-dimethyl; α,α-dimethyl; α,α β-trimethyl; ethyl; α,α-diethyl; α,β-diethyl; α,αβ,β-tetraethyl; isopropyl; sec.-butyl; tert.-amyl; α,β-dihexyl, α,α-dioctyl; heptenyl; undecenyl; and α,β-dilauryl succinic anhydrides. Thus, in the general formula given above the characters R$^6$, R$^7$, R$^8$ and R$^9$ represent either hydrogen atoms, alkyl or alkenyl groups. On the basis of cost and availability those succinic anhydrides which contain 1 or 2 alkyl groups on the same carbon atom are much preferred, although all of the alkyl-substituted succinic anhydrides are perfectly satisfactory from the standpoint of ease of reaction with the oxazolines and thiazolines.

The reactions between the succinic anhydrides and the azolines takes place fairly readily and often exothermically. Reaction takes place even at room temperature (20° C.) but the rate of reaction is unnecessarily slow. Heating of the reactants accelerates the rate of reaction and for this reason a minimum temperature of 50° C. is recommended. Temperatures up to 300° C. are operable but at the higher temperatures byproducts are frequently formed, including polymeric materials especially when the group represented by R$^1$ is unsaturated. Accordingly, an upper temperature of 250° C. is much preferred. It is further advisable to employ lower temperatures when the azoline contains two substituents on the 5-position than when the two substituents are both on the 4-position or on both the 4- and 5-positions. For convenience, inert solvents can be employed. Likewise catalysts, such as alcoholates, zinc chloride and the like, can be used, although ordinarily the reaction takes place rapidly enough in the absence of catalysts. Other expedients well known to those skilled in the art, such as variations in pressure, solvent-extraction of the product, excess of one reactant, particularly the azoline, and the like, can be used without departing from the spirit of this invention which is to prepare succinimido esters by reacting, preferably under the influence of heat, equimolar amounts of a succinic anhydride and an oxazoline or a thiazoline.

The following examples serve to illustrate the process of this invention.

EXAMPLE 1

*Succinimidoethyl acetate*

One-half mole each of succinic anhydride and 2-methyl oxaline were mixed in a flask equipped with a thermometer, a condenser and an agitator. The mixture was heated to 175° C. and held at this temperature for 2 hours. The reaction mixture was then fractionally distilled at a reduced pressure of 2 mm. (Hg). The main fraction, collected at 120° to 140° C., was redistilled and the fraction boiling at 130°–134° C. and 2 mm. (Hg) of pressure had an analysis corresponding to that of succinimidoethyl acetate. Furthermore, the product was identical with succinimidoethyl acetate which had been prepared by the acetylation of N-(β-hydroxyethyl) succinimide.

EXAMPLE 2

*Succinimidoisopropyl butyrate*

Equimolar amounts of succinic anhydride and 2-propyl-5-methyl oxazoline were mixed in a flask equipped with thermometer, condenser and agitator. Heating and stirring was started and the temperature rose to 155° C. where it was maintained for seven hours. At the end of this time the acid number of the reaction mixture was 3 indicating substantially complete reaction. The product was a clear distillable liquid. Its nitrogen-analysis (6.11%) corresponded to that of succinimidoisopropyl butyrate.

EXAMPLE 3

*Succinimidoisopropyl pelargonate*

One-half mole each of 2-octyl-5-methyl oxazoline and succinic anhydride were heated, in a manner like that described in Example 2, for 2 hours at 190° C. The product was then fractionally distilled under a pressure of 1 mm. (Hg). The main fraction, collected at 165°–170° C., was a yellow oil. Its nitrogen-analysis corresponded to that of succinimidoisopropyl pelargonate.

EXAMPLE 4

*Succinimidoisopropyl acetate*

By the procedure of Example 2, a mixture of one mole of succinic anhydride and 1.1 moles of 2-methyl-5-methyl oxazoline was heated for 2 hours at 135° C. A determination of the acid number (95.4) showed that the reaction was 82.5% complete in this time. The product was fractionally distilled and the fraction boiling at 130°–140° C. and 2 mm. of pressure had a nitrogen-content which corresponded to that of succinimidoisopropyl acetate.

EXAMPLE 5

*Succinimidoethyl oleate*

One mole of succinic anhydride and 1.1 moles of 2-(8-heptadecenyl)oxazoline was heated, according to the procedure described above, for 1.5 hours at 200° C. The acid number of the reaction mixture (53.7) indicated that 87% of the succinic anhydride had reacted. The product, succinimidoethyl oleate, was an oily liquid which distilled at 210°–220° C. and 1.5 mm. of pressure.

EXAMPLE 6

*Heptenylsuccinimidoisopropyl isovalerate*

In the same manner, 0.1 mole of heptenylsuccinic anhydride and 0.12 mole of 2-isobutyl-5-methyl oxazoline was heated for one hour at 238°–251° C. The product was fractionally distilled under reduced pressure and there was obtained 22.9 grams (representing a 68% yield) of heptenylsuccinimidoisopropyl isovalerate which boiled at 175°–185° C. and 2 mm. (Hg) of pressure. It contained 4.0% nitrogen an analysis as against a calculated nitrogen-content of 4.15%.

EXAMPLE 7

*(α,α-Dimethylbenzyl)-succinimidoethyl acetate*

In a small sealed tube was reacted 0.01 mole of α,α-dimethylbenzylsuccinic anhydride,

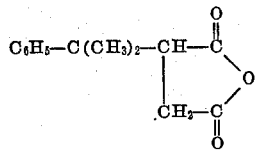

and 0.011 mole of 2-ethyl oxazoline by heating at 160°–175° C. for 1.5 hours. By the end of this period, the reaction-mixture had become very viscous. Titration of this product with standard alkali showed that 96.4% of the anhydride had been converted to the imido-ester.

EXAMPLES 8–20

Further demonstration of the general applicability of the process of this invention was made by reacting equimolar amounts of succinic anhydrides with various oxazolines or thiazolines at 180° C. for three hours, after which the extent of the reaction was determined by titration of the unreacted anhydride with standard caustic solution. Following is a tabulation of the reactants and the extent to which they reacted with the formation of the corresponding succinimido-esters or thioesters according to the general equation above. In all cases, the results of analysis confirm the structure of the imido-ester.

| Anhydride | Azoline | Extent of Reaction |
|---|---|---|
|  |  | Per cent |
| Succinic | 2-(8,11-Heptadecadienyl) oxazoline | 88.5 |
| Do | 2,4,4-Trimethyl oxazoline | 81.0 |
| Methyl succinic | 2-Heptadecyl-5-methyl oxazoline | 91.5 |
| Undecenyl succinic | 2-Heptyl oxazoline | 87.2 |
| α,β-Dimethyl succinic | 2-Propyl-4-ethyl oxazoline | 89.2 |
| α,α-Dimethyl succinic | do | 88.7 |
| Succinic | 2-Heptadecenyl-5-phenyl oxazoline | 94.3 |
| Do | 2-Heptadecenyl-5-(p-chlorophenyl) oxazoline | 92.1 |
| Do | 2-Heptadecyl-5-hexyl oxazoline | 87.4 |
| Methyl succinic | 2-Heptyl-5-methyl thiazoline | 91.3 |
| Succinic | do | 89.7 |
| Do | 2-p-Nitrophenyl-5-ethyl oxazoline | 71.1 |
| Do | 2-p-Chlorophenyl oxazoline | 79.3 |

It will be noted from the above examples that substituted succinic anhydrides react in the same way as succinic anhydride per se, and that the thiazolines and oxazolines also react alike. It is also true that the substituents on the anhydrides and azolines, which are represented by the R's in the general formulas above, do not take part in the reaction and do not interfere with the reaction between the anhydrides and the azolines. Extensive study of the general process has shown that it is most advisable to employ lower temperatures of reaction when the azoline carries two substituents on the 5-position than when it carries two substituents on the 4-position or one each on the 4- and 5-positions or two on the 4-position and a third on the 5-position. When such a 5,5-disubstituted azoline is employed, it is suggested that the temperature be maintained below 150° C.

The products of this invention have a wide variety of uses. Many of them have marked properties as regulants for plant growth. Others, especially those containing sulfur, are effective as additives for lubricating oils. Still others, particularly those which contain long hydrocarbon substituents, or a plurality of shorter hydrocarbon groups, are useful as plasticizers for synthetic plastics.

I claim:

1. A process for the preparation of β-succinimidoethyl esters of the general formula

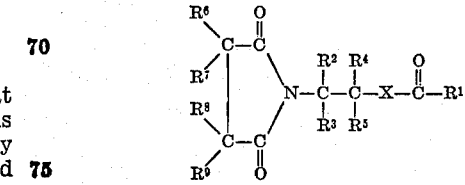

which comprises chemically reacting at a temperature from 20° C. to 300° C. equimolar amounts of a succinic anhydride of the formula

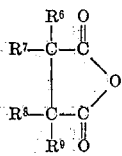

and an azoline of the general formula

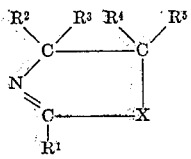

in which X is an atom from the class consisting of sulfur and oxygen; $R^2$, $R^3$, $R^4$ and $R^5$ represent members of the class consisting of hydrogen atoms and alkyl, aryl, alkaryl, aralkyl, and cycloalkyl groups; $R^1$ represents a member of the class consisting of alkyl, aryl, aralkyl, alkaryl, and cyclohexyl groups and monounsaturated and diunsaturated aliphatic hydrocarbon groups containing not more than 17 carbon atoms; and $R^6$, $R^7$, $R^8$ and $R^9$ represent members of the class consisting of hydrogen atoms, alkyl groups and alkenyl groups.

2. A process for the preparation of β-succinimidoethyl oleate which comprises reacting at a temperature from 50° C. to 250° C. equimolar amounts of succinic anhydride and 2-heptadecenyl oxazoline.

3. A process for the preparation of β-succinimidoethyl linoleate which comprises reacting at a temperature from 50° C. to 250° C. equimolar amounts of succinic anhydride and 2-heptadecadienyl oxazoline.

4. A process for the preparation of β-succinimidoethyl thiolinoleate which comprises reacting at a temperature from 50° C. to 250° C. equimolar amounts of succinic anhydride and 2-heptadecadienyl thiazoline.

5. A process for the preparation of succinimidoisopropyl linoleate which comprises reacting at a temperature of 50° C. to 250° C. equimolar amounts of succinic anhydride and 2-heptadecadienyl-5-methyl oxazoline.

6. A process for the preparation of succinimidoethyl laurate which comprises reacting at a temperature of 50° C. and 250° C. equimolar amounts of succinic anhydride and 2-undecenyl oxazoline.

STANLEY P. ROWLAND.

REFERENCES CITED

The following references are of record in the file of this patent:

UNITED STATES PATENTS

| Number | Name | Date |
|---|---|---|
| 2,256,157 | Watt | Sept. 16, 1941 |
| 2,487,106 | Cornwell | Nov. 8, 1949 |

FOREIGN PATENTS

| Number | Country | Date |
|---|---|---|
| 143,272 | Switzerland | Jan. 16, 1931 |